United States Patent
Baba et al.

(10) Patent No.: US 10,749,388 B2
(45) Date of Patent: Aug. 18, 2020

(54) STATOR, MOTOR, COMPRESSOR, AND REFRIGERATION AIR CONDITIONER

(71) Applicant: Mitsubishi Electric Corporation, Tokyo (JP)

(72) Inventors: Kazuhiko Baba, Tokyo (JP); Masahiro Nigo, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/081,704

(22) PCT Filed: May 30, 2016

(86) PCT No.: PCT/JP2016/065882
§ 371 (c)(1),
(2) Date: Aug. 31, 2018

(87) PCT Pub. No.: WO2017/208293
PCT Pub. Date: Dec. 7, 2017

(65) Prior Publication Data
US 2019/0081521 A1 Mar. 14, 2019

(51) Int. Cl.
*H02K 1/18* (2006.01)
*H02K 1/02* (2006.01)
(Continued)

(52) U.S. Cl.
CPC .............. *H02K 1/18* (2013.01); *H02K 1/02* (2013.01); *H02K 1/08* (2013.01); *H02K 1/148* (2013.01);
(Continued)

(58) Field of Classification Search
CPC .......... H02K 1/185; H02K 1/276; H02K 3/18; H02K 7/14
(Continued)

(56) References Cited

U.S. PATENT DOCUMENTS

| 6,047,460 A * | 4/2000 | Nagate | H02K 1/276 205/137 |
|---|---|---|---|
| 2009/0152956 A1* | 6/2009 | Yang | H02K 1/02 310/12.25 |
| 2013/0140933 A1* | 6/2013 | Katsuhisa | H02K 29/03 310/156.08 |

FOREIGN PATENT DOCUMENTS

JP 2000-078780 A 3/2000
JP 2000-341889 A 12/2000
(Continued)

OTHER PUBLICATIONS

International Search Report of the International Searching Authority dated Aug. 16, 2016 for the corresponding international application No. PCT/JP2016/065882 (and English translation).
(Continued)

*Primary Examiner* — Terrance L Kenerly
(74) *Attorney, Agent, or Firm* — Posz Law Group, PLC

(57) ABSTRACT

A stator includes a first core including a plurality of non-oriented electromagnetic steel sheets that is stacked and having an insertion hole penetrating the plurality of non-oriented electromagnetic steel sheets in an axial direction of the stator and a second core arranged in the insertion hole and including a plurality of oriented electromagnetic steel sheets that is stacked. The first core has a thin-wall part adjoining the second core, and a conditional expression of $0.5tm \leq ta \leq 2tm$ is satisfied, where ta denotes a thickness of the thin-wall part when the first core is viewed in the axial direction and tm denotes a sheet thickness of one non-oriented electromagnetic steel sheet in the plurality of non-oriented electromagnetic steel sheets.

10 Claims, 14 Drawing Sheets

(51) Int. Cl.
    *H02K 7/14*     (2006.01)
    *H02K 1/14*     (2006.01)
    *H02K 1/08*     (2006.01)
    *H02K 1/27*     (2006.01)
    *H02K 3/18*     (2006.01)
(52) U.S. Cl.
    CPC ............ *H02K 1/185* (2013.01); *H02K 1/276* (2013.01); *H02K 3/18* (2013.01); *H02K 7/14* (2013.01)
(58) Field of Classification Search
    USPC ...................................................... 310/156.1
    See application file for complete search history.

(56) References Cited

FOREIGN PATENT DOCUMENTS

| JP | 2003-264947 A | 9/2003 | |
|---|---|---|---|
| JP | 2010-259246 A | 11/2010 | |
| JP | 2011244670 | * 12/2011 | ............... H02K 1/18 |

OTHER PUBLICATIONS

Office Action dated Nov. 27, 2019 issued in corresponding CN patent application No. 201680085097.8 (and English translation).

* cited by examiner

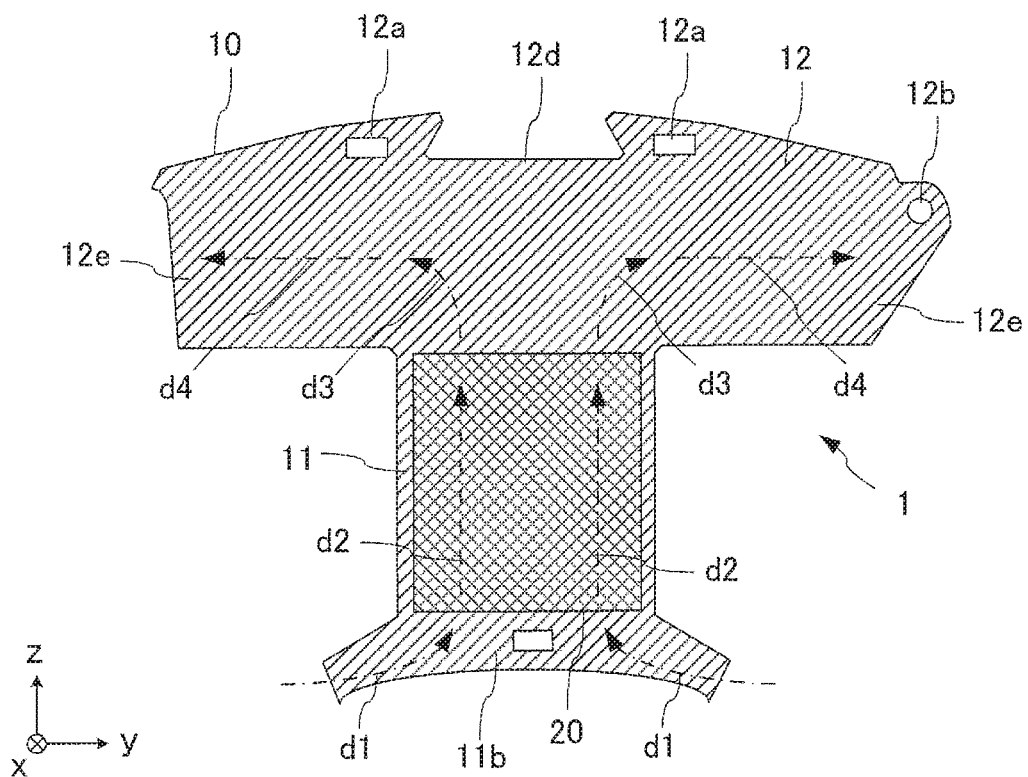
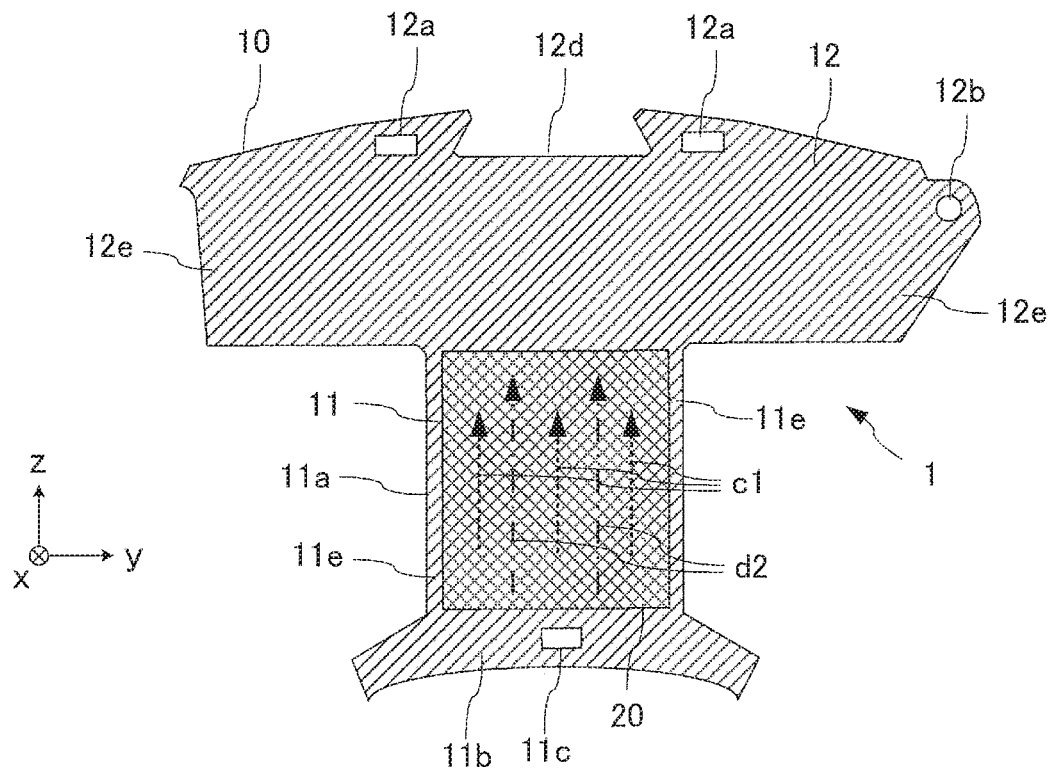

STATOR, MOTOR, COMPRESSOR, AND REFRIGERATION AIR CONDITIONER

CROSS REFERENCE TO RELATED APPLICATION

This application is a U.S. national stage application of International Patent Application No. PCT/JP2016/065882 filed on May 30, 2016, the disclosure of which is incorporated herein by reference.

TECHNICAL FIELD

The present invention relates to a stator, a motor, a compressor, and a refrigeration air conditioner.

BACKGROUND ART

A stator core used for a motor includes tooth parts around which windings are wound and yoke parts formed on the outer side of the tooth parts in regard to a radial direction to be continuous with the tooth parts. A core for a rotary machine described in Patent Reference 1 includes tooth parts and core back parts (yoke parts), wherein each tooth part is formed of oriented silicon steel sheets (oriented electromagnetic steel sheets) and each core back part (yoke part) is formed of non-oriented silicon steel sheets (non-oriented electromagnetic steel sheets).

Patent Reference

Patent Reference 1: Japanese Patent Application Publication No. 2000-341889 (for example, claim 1, paragraph 0031)

However, the oriented electromagnetic steel sheets have characteristics in that a low iron loss property can be obtained when their easy magnetization direction and a flow direction of magnetic flux coincide with each other but the iron loss adversely increases greatly when a deviation occurs between the easy magnetization direction and the flow direction of the magnetic flux. In the core for the rotary machine described in Patent Reference 1, the magnetic flux flows obliquely while curving in a tooth tip end part on an inner-radius side of the tooth part, and thus there is a problem in that the iron loss increases due to the occurrence of the deviation between the direction of the magnetic flux flowing in the tooth tip end part and the easy magnetization direction of the oriented electromagnetic steel sheets (a direction in which the iron loss is minimized).

SUMMARY

The present invention has been made to resolve the above-described problem in the conventional technology, and its object is to obtain a stator of high efficiency reducing iron loss, a motor comprising the stator, a compressor comprising the motor, and a refrigeration air conditioner comprising the compressor.

A stator according to an aspect of the present invention comprises a first core including a plurality of non-oriented electromagnetic steel sheets stacked in layers and having an insertion hole penetrating the plurality of non-oriented electromagnetic steel sheets in an axial direction of the stator; and a second core arranged in the insertion hole and including a plurality of oriented electromagnetic steel sheets stacked in layers, wherein the first core has a thin-wall part adjoining the second core, and a conditional expression of $0.5 tm \leq ta \leq 2 tm$ is satisfied, where ta denotes a thickness of the thin-wall part when the first core is viewed in the axial direction and tm denotes a sheet thickness of one non-oriented electromagnetic steel sheet in the plurality of non-oriented electromagnetic steel sheets.

A motor according to another aspect of the present invention comprises the stator described above, a rotor, and a support part to which the stator is fixed and which supports the rotor to be rotatable.

A compressor according to another aspect of the present invention comprises the motor described above.

A refrigeration air conditioner according to another aspect of the present invention comprises the compressor described above.

According to the stator and the motor according to the present invention, an effect is obtained in that a motor of high efficiency reducing the iron loss can be obtained. Further, according to the compressor and the refrigeration air conditioner according to the present invention, an effect is obtained in that the power consumption can be reduced by use of the motor of high efficiency.

BRIEF DESCRIPTION OF THE DRAWINGS

FIG. 4 is a diagram showing directions of magnetic fluxes flowing in a stator core (in a state in which the first oriented core is embedded in the first core) in the first embodiment.

FIG. 5 is a cross-sectional view showing a schematic configuration of the stator core (in the state in which the first oriented core is embedded in the first core) in the first embodiment.

DETAILED DESCRIPTION

Figure 1:
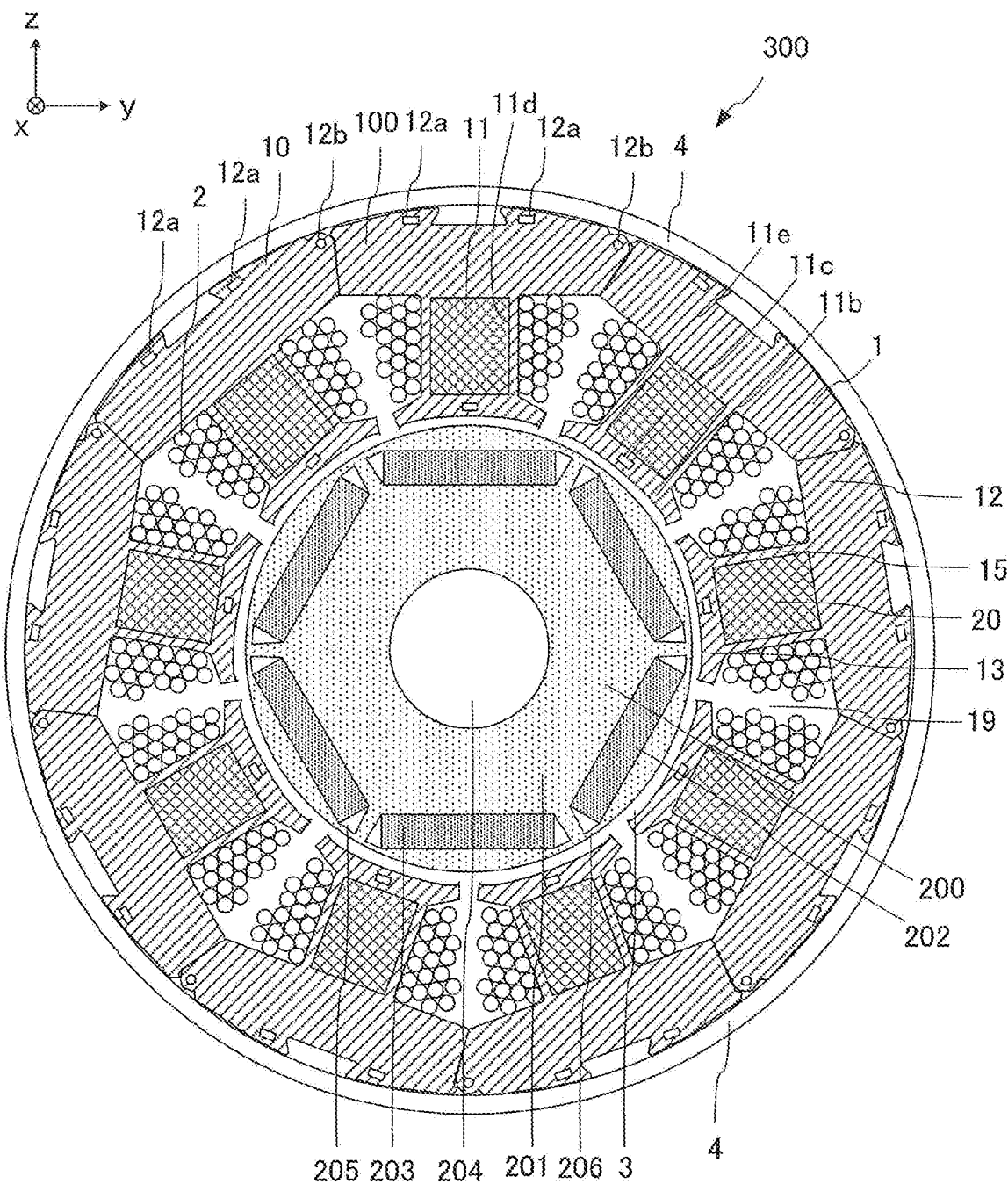
FIG. 1 is a cross-sectional view showing a schematic configuration of a motor including a stator according to a first embodiment of the present invention.

Stators, a motor, a compressor and a refrigeration air conditioner according to embodiments of the present invention will be described below with reference to the drawings. An xyz orthogonal coordinate system is shown in the drawings to facilitate understanding of the relationship among the drawings. An x-axis in the drawings is shown as a coordinate axis parallel to a rotary shaft of the motor. A y-axis in the drawings is shown as a coordinate axis parallel to a horizontal direction in FIG. 1. A z-axis in the drawings is shown as a coordinate axis parallel to a vertical direction in FIG. 1.

(1) First Embodiment (1-1) Configuration

FIG. 1 is a cross-sectional view showing a schematic configuration of a motor 300 including a stator 100 according to a first embodiment of the present invention. As shown in FIG. 1, the motor 300 includes the stator 100 and a rotor 200. The stator 100 includes a stator core 1 made by stacking electromagnetic steel sheets punched out into a specific shape, a non-illustrated insulator made of insulating material, and windings 2 wound around tooth parts 11 of the stator core 1 via the insulator. The rotor 200 is rotatably inserted in an inner-radius side of the stator 100 via a gap 3. The motor 300 has a housing 4 surrounding the stator 100. The housing 4 is in a cylindrical shape, for example. The stator 100 is held in the housing 4 by means of shrink fitting, press fitting, welding or the like. Further, in the housing 4, the rotor 200 is rotatably supported via shaft bearings.

As shown in FIG. 1, the stator core 1 includes first cores 10 and first oriented cores 20 (second cores) each inserted in a core insertion hole 11d (first insertion hole) of the first core 10. The first cores 10 include yoke parts 12 in a ring-like shape and tooth parts 11 arranged on the inner-radius side of the yoke parts 12 to be continuous with the yoke parts 12.

The tooth parts 11 are arranged at regular intervals in a rotation direction of the rotor 200 and extend from the yoke parts 12 in directions heading toward a center of the stator core 1. In the example shown in FIG. 1, the stator 100 according to the first embodiment includes nine tooth parts 11. The number of the tooth parts 11 is not limited to that in this example. In the stator core 1, nine slots 19 as spaces demarcated by the windings 2 wound around the tooth parts 11 are formed.

As mentioned above, the windings 2 for generating a rotating magnetic field is wound around the tooth parts 11 of the stator core 1. For example, the winding 2 is formed by winding magnet wire by means of concentrated winding, which allows the magnet wire to be directly wound around the tooth part 11 via the insulator, and is connected by means of three-phase Y connection. The number of times of winding the winding 2 and the wire diameter of the winding 2 are determined according to requested characteristics (revolution speed, torque, etc.), voltage specifications, and cross-sectional area of the slot. In this example, the yoke parts 12 are unfolded into a belt-like shape to make each first core 10 include one tooth part 11 in order to facilitate the winding, a magnet wire having a wire diameter of approximately $\phi 1.0$ mm is wound around each tooth part 11 for 80 turns or so, and after the winding work, the ring-shaped stator 100 is formed by rounding the yoke parts 12 in the belt-like shape into a ring-like shape and welding both ends of the yoke parts 12 to each other.

The rotor 200 is a rotor of the permanent magnet embedded (IPM: Interior Permanent Magnet) type, and includes a rotor core part 201. As shown in FIG. 1, the rotor 200 includes a shaft 204 at its center. In the rotor core part 201, magnet insertion holes 202 are arranged in the circumferential direction; the number of the magnet insertion holes 202 corresponds to the number of magnetic poles. A plurality of permanent magnets 203 are inserted into the magnet insertion holes 202 and fixed. The permanent magnets 203 is magnetized so that a direction of magnetization of each permanent magnet 203 is a direction toward a wide surface of each flat plate as each permanent magnet 203, and is arranged so that, in each magnetic pole, the same poles are pointed in a radial direction of the rotor. Incidentally, while a case where the number of magnetic poles of the rotor 200 is six is illustrated in FIG. 1, the number of magnetic poles of the rotor 200 can be any even number larger than or equal to two. As the permanent magnet 203, a rare-earth magnet containing neodymium, iron and boron as principal components can be used.

As shown in FIG. 1, each magnet insertion hole 202 is formed of a vacant space, and the permanent magnet 203 is inserted in the vacant space. Further, a flux barrier 205 (leakage flux inhibition hole) is provided at each end of the magnet insertion hole 202 in the circumferential direction in order to reduce the leakage flux between different magnetic poles adjacent to each other. The rotor core part 201 further includes rotor thin-wall parts 206 designed to be thin to narrow the flux path so as to prevent a short circuit of magnetic flux between adjacent permanent magnets 203 between the outer circumference of the rotor 200 and the flux barriers 205. A width of the rotor thin-wall part 206 is a thickness which is approximately equal to a thickness of the electromagnetic steel sheet, e.g., 0.35 mm.

Figure 2:
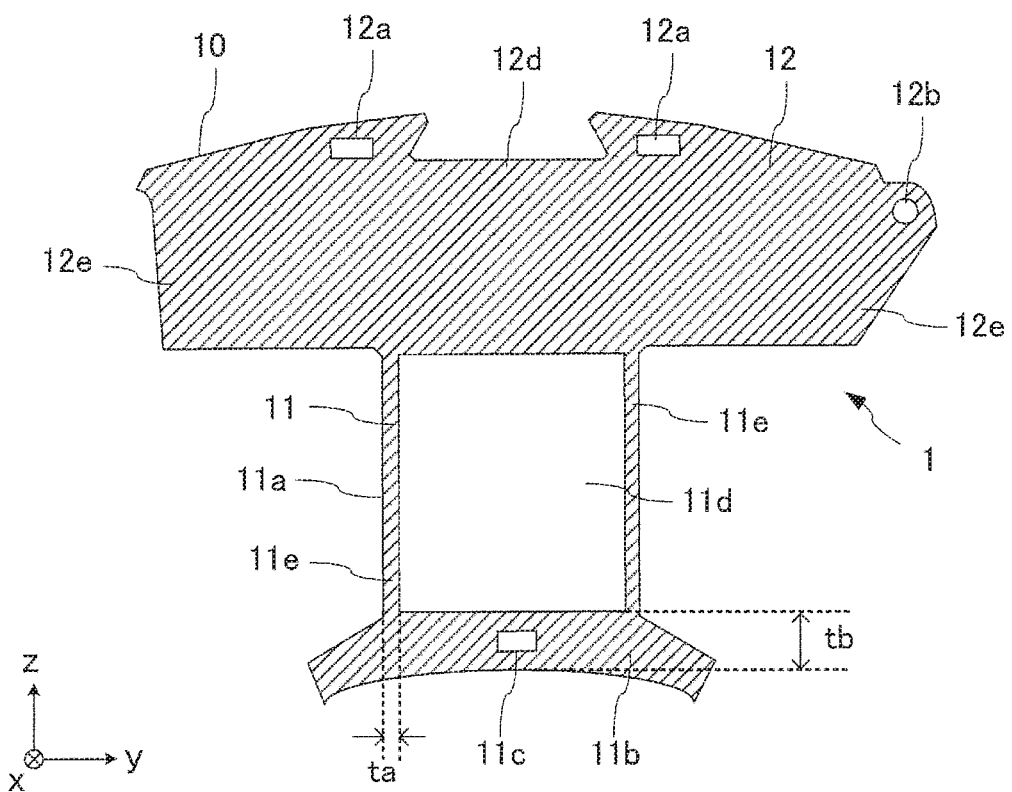
FIG. 2 is a cross-sectional view showing a schematic configuration of a first core in the first embodiment.
Figure 3A:
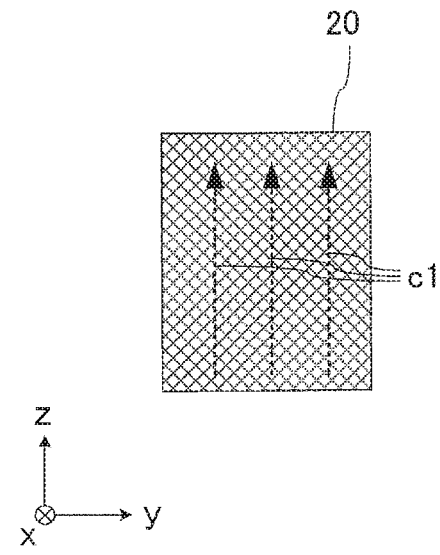
FIG. 3(a) is a cross-sectional view showing a schematic configuration of a first oriented core as a second core in the first embodiment.
Figure 3B:
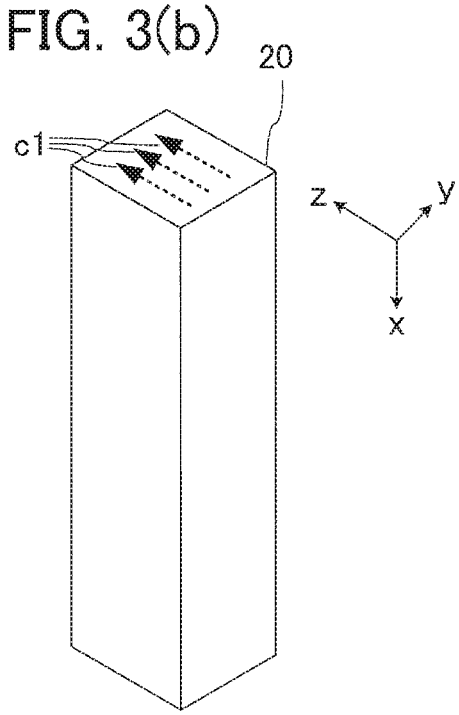
FIG. 3(b) is a schematic perspective view of the first oriented core.

FIG. 2 is a cross-sectional view showing a schematic configuration of the first core 10 in the first embodiment. FIG. 3(a) is a cross-sectional view showing a schematic configuration of the first oriented core 20 as the second core in the first embodiment, and FIG. 3(b) is a perspective view showing a schematic configuration of the first oriented core 20 in the first embodiment. FIG. 4 is a diagram showing directions of magnetic fluxes (typical magnetic fluxes) flowing in the stator core 1 (in the state in which the first oriented core 20 is embedded in the first core 10) in the first embodiment. FIG. 5 is a cross-sectional view showing a schematic configuration of the stator core 1 (in the state in which the first oriented core 20 is embedded in the first core 10) in the first embodiment. The stator core 1 in the first embodiment includes the first cores 10 shown in FIG. 2 and the first oriented cores 20 as the second cores shown in FIGS. 3(a) and 3(b). The first core 10 is formed of a plurality of non-oriented electromagnetic steel sheets stacked in layers, for example. The first oriented core 20 is formed of an oriented electromagnetic steel sheet (e.g., a plurality of oriented electromagnetic steel sheets stacked in layers). The non-oriented electromagnetic steel sheet is an electromagnetic steel sheet configured to have random crystal axis directions so as not to be magnetized in a particular direction. The oriented electromagnetic steel sheet is an electromagnetic steel sheet having the crystal axis directions uniformalized in a particular direction and having an easy magnetization direction in a particular direction.

As shown in FIG. 2, each first core 10 includes the tooth part 11 and the yoke part 12 which are formed continuously as one body, and the first cores 10 demarcate the outline of the stator core 1 in the first embodiment. As shown in FIG. 2, the tooth part 11 includes a winding part 11a around which the winding 2 is wound and a tooth tip end part 11b formed on the inner-radius side of each tooth part 11 and having a rotor counter surface extending in the circumferential direction. Further, a tooth crimping part 11c is formed in the tooth part 11 to fix the electromagnetic steel sheets together in an axial direction.

As shown in FIG. 2, the yoke part 12 includes a yoke central part 12d and yoke end parts 12e. The yoke central part 12d means a central part of the yoke part 12 as a part connected to the tooth part 11. The yoke end part 12e is formed in the yoke part 12 on each side of the yoke central part 12d in the circumferential direction. Yoke crimping parts 12a are formed in the yoke part 12 to fix the electromagnetic steel sheets constituting the yoke part 12 together in the axial direction. The numbers of the tooth crimping parts 11c and the yoke crimping parts 12a are not limited to the numbers in the illustration. Formed in a right end part (an end on the +y direction side) of the yoke part 12 in the circumferential direction is a yoke connection part 12b for connecting the yoke parts 12 of adjacent first cores 10 to each other.

As shown in FIG. 2, each thin-wall part 11e as a side wall part of the tooth part 11 is formed between the core insertion hole 11d and the tooth part 11 of the first core 10. The thin-wall part 11e is a part where a side wall of the tooth part 11 of the first core 10 is formed to be thin. The thin-wall part 11e is formed continuously in the axial direction of the stator core 1 in the first embodiment (x direction). A thickness ta of the thin-wall part 11e (approximately a thickness in the circumferential direction of the stator) is desired to be as thin as possible within a range in which sufficient strength can be secured. By reducing the thickness of the thin-wall part 11e, the magnetic flux flowing into the thin-wall part 11e can be inhibited and the magnetic flux can be proactively fed to the first oriented core 20 as the second core. Accordingly, the iron loss in the stator 100 of the motor 300 can be reduced. Let ta denote the thickness of the thin-wall part 11e and tm denote a thickness (sheet thickness) of one electromagnetic steel sheet in the electromagnetic steel sheets constituting the first core, and the following conditional expression is desired to hold:

$$0.5 tm \leq ta \leq 2 tm.$$

The thickness ta of the thin-wall part 11e is 0.2 mm to 1 mm, for example.

Further, a thickness tb of the tooth tip end part 11b in a radial direction of the stator 100 is configured to be greater than the thickness of the thin-wall part 11e provided in the tooth part 11. For example, the thickness tb is approximately five times the thickness ta of the thin-wall part 11e. By configuring the thickness tb of the tooth tip end part 11b in the radial direction to be greater than the thickness ta of the thin-wall part 11e as above, magnetic flux flowing in the tooth tip end part 11b while curving flows into the first core 10, by which magnetic flux in directions different from the easy magnetization direction of the first oriented core 20 as the second core can be inhibited from flowing into the first oriented core 20. Accordingly, the increase in the iron loss of the tooth tip end part 11b can be inhibited and the stator 100 of high efficiency can be obtained.

As shown in FIGS. 3(a) and 3(b), the first oriented core 20 is in a shape like a rectangular prism with a rectangular top surface which is long in the radial direction, and is formed so that its easy magnetization direction c1 is parallel to the radial direction of the stator 100 (z direction). The easy magnetization direction c1 of the first oriented core 20 is indicated by broken line arrows in the drawings.

As shown in FIG. 4, the magnetic fluxes from the rotor 200 flow into the first core while curving from the outside of the tooth tip end part 11b toward the inside of the tooth part 11 (magnetic fluxes d1), flow in the radial direction (+z direction) in a central part of the tooth part 11 (magnetic fluxes d2), flow in a central part of the yoke part 12 while curving from the central part of the tooth part toward both end parts of the yoke part (magnetic fluxes d3), and flow in the circumferential directions (+y direction and -y direction) in the both end parts of the yoke part 12 (magnetic fluxes d4). While this explanation of the magnetic flux flow directions (magnetic fluxes d1, d2, d3 and d4) is given of the first core 10 in the first embodiment, the same goes for second and subsequent embodiments described later.

As shown in FIG. 5, the core insertion hole 11d is formed in the tooth part 11 of the first core 10, and the first oriented core 20 is embedded in the core insertion hole 11d by means of fitting together, such as clearance fit (loose fit), interference fit (tight fit) or transition fit (intermediate fit). In FIG. 5, the direction of the magnetic fluxes generated from the rotor 200 and flowing in the first oriented core 20 is indicated by dash dot line arrows (magnetic fluxes d2). As shown in FIG. 5, the easy magnetization direction c1 of the first oriented core 20 as the second core and the direction of the magnetic fluxes d2 flowing in the first oriented core 20 coincide with each other. Here, to "coincide" includes a case where the principal (typical) easy magnetization direction c1 of the first oriented core 20 and the direction of a principal (typical) magnetic flux flowing in the first oriented core 20 are equal (approximately coincide with each other or are nearly equal).

(1-2) Effect

In the stator 100 according to the first embodiment, the stator core 1 includes the first cores 10 each formed of the plurality of non-oriented electromagnetic steel sheets stacked in layers and the first oriented cores 20 as the second cores each formed of the oriented electromagnetic steel sheets, and the first oriented core 20 is inserted in the core insertion hole 11d formed in the tooth part 11 of the first core 10. Further, the easy magnetization direction c1 of the first oriented core 20 and the direction of the magnetic fluxes d2 flowing in the first oriented core 20 approximately coincide with each other. Accordingly, the iron loss occurring in the stator core 1 can be reduced and the stator 100 of high efficiency can be obtained.

In the stator 100 according to the first embodiment, the thin-wall part 11e is formed between the core insertion hole 11d and the tooth part 11 of the first core 10. Let ta denote the thickness of the thin-wall part 11e and tm denote the thickness of one electromagnetic steel sheet in the electromagnetic steel sheets, and the thin-wall part 11e is formed to have a thickness satisfying the relationship of $0.5tm \leq ta \leq 2tm$. According to this, the magnetic flux flowing into the thin-wall part 11e as the first core 10 can be inhibited and the magnetic flux can be proactively fed to the first oriented core 20 as the second core formed of oriented electromagnetic steel sheets. Accordingly, the stator 100 of high efficiency capable of reducing the iron loss can be obtained.

In the stator 100 according to the first embodiment, the thickness tb of the tooth tip end part 11b in the radial direction is configured to be greater than the thickness to of the thin-wall part 11e provided in the tooth part 11. By configuring the thickness tb of the tooth tip end part 11b in the radial direction to be greater than the thickness of the thin-wall part 11e as above, the magnetic fluxes d1 flowing in the tooth tip end part while curving flow into the first core 10 formed of non-oriented electromagnetic steel sheets, by which magnetic fluxes in directions different from the easy magnetization direction c1 of the first oriented core 20 formed of oriented electromagnetic steel sheets can be inhibited from flowing into the first oriented core 20. Accordingly, the increase in the iron loss in the tooth tip end part 11b can be inhibited and the stator 100 of high efficiency can be obtained.

(2) Second Embodiment

Figure 6:
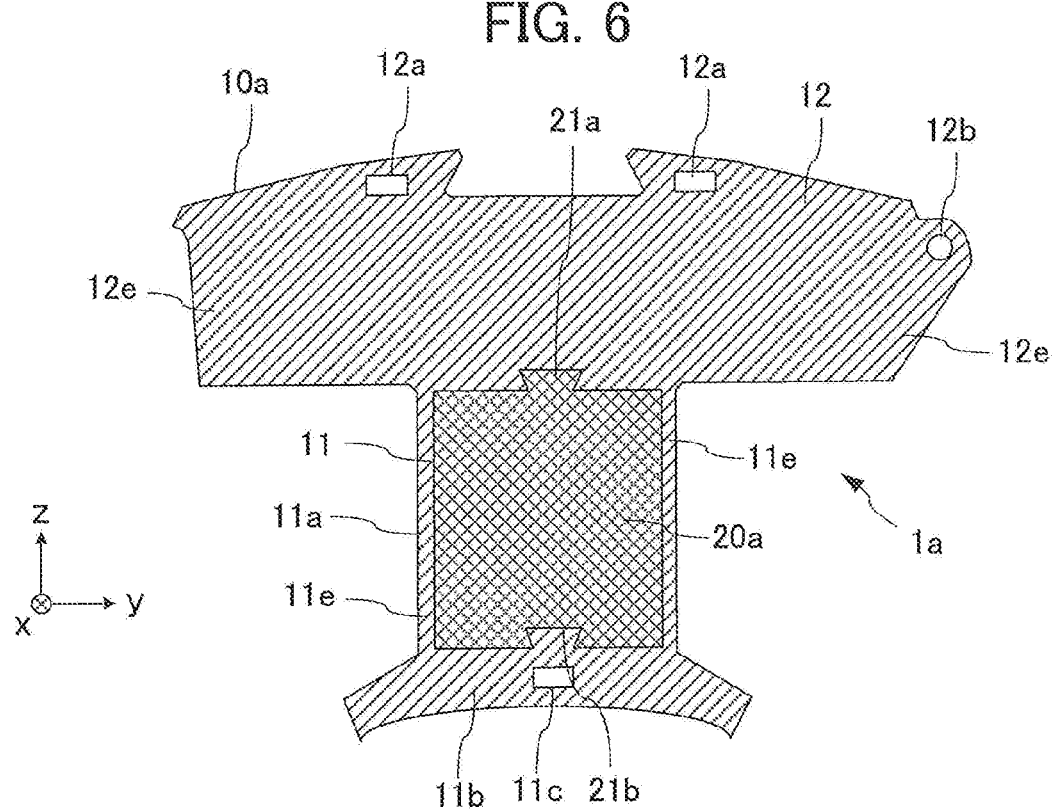
FIG. 6 is a cross-sectional view showing a schematic configuration of a stator core (in a state in which a first oriented core as a second core is embedded in a first core) in a second embodiment of the present invention.

FIG. 6 is a cross-sectional view showing a schematic configuration of a stator core 1a (in a state in which a first oriented core 20a as a second core is embedded in a first core 10a) in a second embodiment of the present invention. In FIG. 6, each component identical or corresponding to a component shown in FIG. 5 is assigned the same reference character as a reference character shown in FIG. 5. The stator core 1a in the second embodiment differs from the stator core 1 of the stator 100 in the first embodiment in that a convex part 21a and a concave part 21b for fitting the first core 10a and the first oriented core 20a together are provided in boundary parts separating the first core 10a and the first oriented core 20a in the radial direction (z direction).

As shown in FIG. 6, in the boundary parts between the first core 10a and the first oriented core 20a, a concave part and a convex part as fitting parts for fitting the first core 10a and the first oriented core 20a together are provided. In FIG. 6, the first oriented core 20a has a convex part 21a on the outer side in the radial direction and a concave part 21b on the inner side in the radial direction. Further, a length of the first oriented core 20a in the radial direction (z direction) is set to be shorter than a length of the core insertion hole of the first core 10a in the radial direction (z direction).

In the stator 100 according to the second embodiment, the convex part and the concave part are provided in the boundary parts between the first core 10a and the first oriented core 20a, and the first core 10a and the first oriented core 20a are fitted together by means of press fitting or the like. This makes it possible to increase rigidity of the stator core 1a and to inhibit the increase in vibration and noise of the motor 300.

In the stator 100 according to the second embodiment, the length of the first oriented core 20a in the radial direction (z direction) is set to be slightly shorter than the length of the core insertion hole of the first core 10a in the radial direction (z direction). Accordingly, when the first core and the first oriented core are fitted together, a tensile load in the same direction as the easy magnetization direction c1 can be applied to the first oriented core 20a. By the application of the tensile load in the same direction as the easy magnetization direction c1 of the first oriented core 20a, magnetic properties of the first oriented core 20a are improved and the iron loss of the first oriented core 20a can be reduced further.

(3) Third Embodiment

Figure 7:
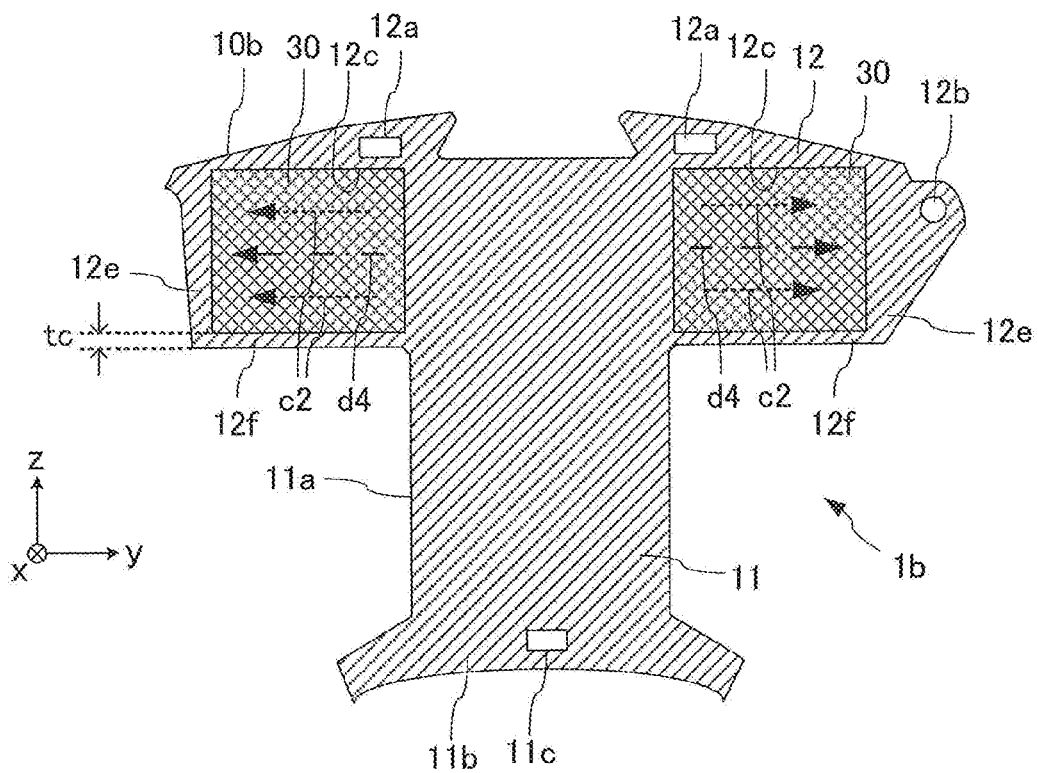
FIG. 7 is a cross-sectional view showing a schematic configuration of a stator core (in a state in which second oriented cores as second cores are embedded in a first core) in a third embodiment of the present invention.

FIG. 7 is a cross-sectional view showing a schematic configuration of a stator core 1b (in a state in which second oriented cores 30 as second cores are embedded in a first core 10b) in a third embodiment of the present invention. In FIG. 7, each component identical or corresponding to a component shown in FIG. 5 is assigned the same reference character as a reference character shown in FIG. 5. The stator core 1b in the third embodiment differs from the stator core 1 in the first embodiment in that the second oriented cores 30 (second cores) instead of the first oriented core 20 are provided in the yoke end parts 12e of the first core 10b.

As shown in FIG. 7, the second oriented cores 30 are embedded in the yoke end parts 12e of the stator core 1b in the third embodiment. Each second oriented core 30 is formed of oriented electromagnetic steel sheets similarly to the first oriented core 20. Here, the direction of the magnetic flux flowing in the yoke end parts 12e of the stator core 1b is indicated by dash dot line arrows (magnetic fluxes d4). As indicated by dash dot line arrows, in the yoke part of the stator core, each magnetic flux flows in the circumferential direction. The easy magnetization direction c2 of the second oriented core is indicated by broke line arrows. As shown in FIG. 7, the direction of the magnetic fluxes d4 flowing in each yoke end part 12e of the stator core 1b and the easy magnetization direction c2 of the second oriented core 30 approximately coincide with each other.

Further, a thin-wall part 12f of the first core 10b is formed on the inner-radius side of each core insertion hole 12c (second insertion hole) of the first core in which the second oriented core 30 is inserted. Let tc denote a thickness of the thin-wall part 12f and tm denote a thickness (sheet thickness) of one electromagnetic steel sheet in the electromagnetic steel sheets constituting the first core, and a relationship of $0.5tm \leq tc \leq 2tm$ is desired to hold. The thickness tc of the thin-wall part 12f is 0.2 mm to 1 mm, for example. Further, the thickness tc is equivalent to the thickness ta in the first and second embodiments, and thus the thickness tc can be also described as ta.

In the stator 100 according to the third embodiment, the stator core 1b includes the second oriented cores 30 as the second cores, and the direction of the magnetic flux d4 flowing in each yoke end part 12e of the stator core 1b and the easy magnetization direction c2 of the second oriented core 30 approximately coincide with each other. Accordingly, a stator of high efficiency inhibiting the iron loss can be obtained.

In the stator 100 according to the third embodiment, the thin-wall part 12f as a side wall part of the first core 10b is formed on the inner-radius side of each core insertion hole 12c of the first core in which the second oriented core 30 as the second core is inserted. Let tc denote the thickness of the thin-wall part 12f and tm denote the thickness (sheet thickness) of one electromagnetic steel sheet in the electromagnetic steel sheets, and the relationship of $0.5\text{tm} \leq \text{tc} \leq 2\text{tm}$ holds. According to this, the magnetic flux flowing into the thin-wall part 12f as a part of the first core can be reduced and the magnetic flux can be proactively increased in the second oriented core 30 formed of oriented electromagnetic steel sheets. Accordingly, the stator 100 of high efficiency reducing the iron loss can be obtained.

(4) Fourth Embodiment

Figure 8:
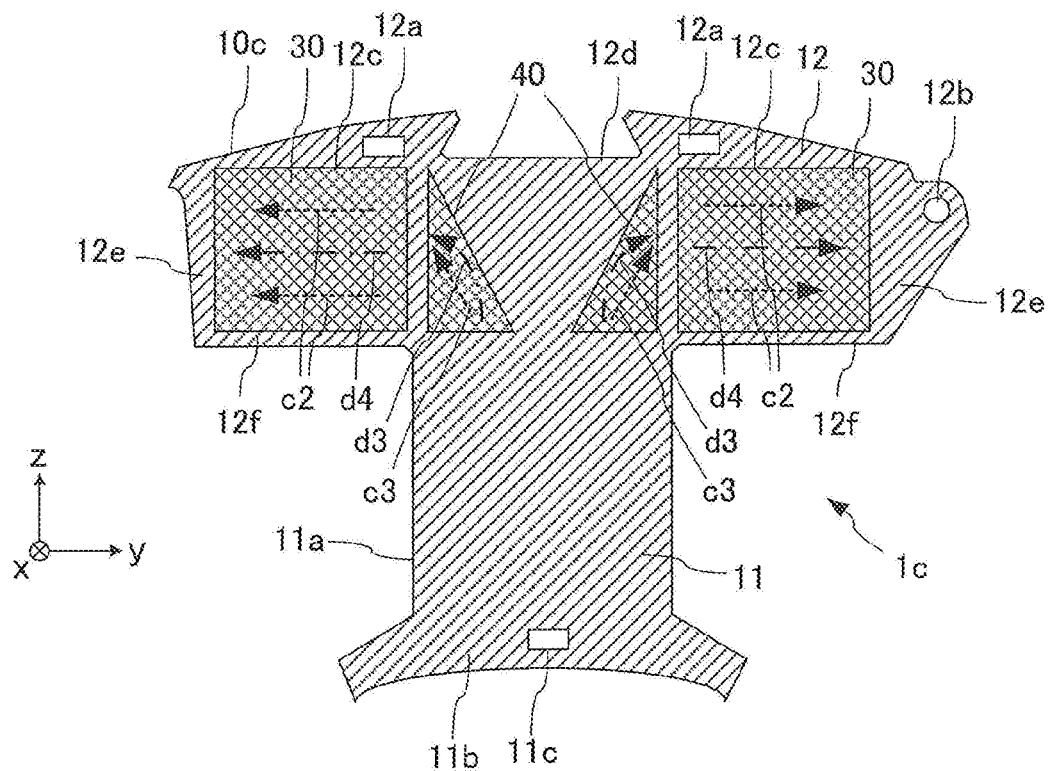
FIG. 8 is a cross-sectional view showing a schematic configuration of a stator core (in a state in which the second oriented cores and third oriented cores as the second cores are embedded in a first core) in a fourth embodiment of the present invention.

FIG. 8 is a cross-sectional view showing a schematic configuration of a stator core 1c (in a state in which the second oriented cores 30 as second cores and third oriented cores 40 as the second cores are embedded in a first core 10c) in a fourth embodiment of the present invention. In FIG. 8, each component identical or corresponding to a component shown in FIG. 7 is assigned the same reference character as a reference character shown in FIG. 7. The stator core 1c in the fourth embodiment differs from the stator core 1b in the third embodiment in that the third oriented cores 40 (second cores) are provided in a yoke central part 12d of the first core 10c.

As shown in FIG. 8, in each yoke central part 12d of the stator core 1c in the fourth embodiment, the third oriented core 40 in a shape like a triangular prism having a top surface approximately in a right triangle shape is embedded in two core insertion holes. The third oriented core 40 as the second core is formed of oriented electromagnetic steel sheets similarly to the first oriented core 20. Here, directions of magnetic fluxes d3 flowing in the yoke central part 12d of the stator core 1c are indicated by dash dot line arrows.

As shown in FIG. 8, each direction of the magnetic fluxes d3 flowing in the yoke central part 12d of the stator core 1c in the fourth embodiment is a direction curving from a central part of the first core insertion hole 11d toward a central part of the second core insertion hole 12c. The easy magnetization direction c3 of each third oriented core 40 is indicated by a dotted line arrow. As shown in FIG. 8, the easy magnetization direction c3 of each third oriented core 40 is an oblique direction heading from the central part of the first core insertion hole 11d toward the central part of the second core insertion hole 12c. As shown in FIG. 8, the directions of the magnetic fluxes d3 flowing in each third oriented core 40 of the stator core 1c in the fourth embodiment and the easy magnetization directions c3 of the third oriented core 40 approximately coincide with each other.

In the stator 100 according to the fourth embodiment, the stator core 1c includes the third oriented cores 40, and the direction d3 of the magnetic flux flowing in each third oriented core 40 of the stator core 1c and the easy magnetization direction c3 of the third oriented core 40 approximately coincide with each other. Accordingly, a stator 100 of high efficiency inhibiting the iron loss can be obtained.

(5) Fifth Embodiment

Figure 9:
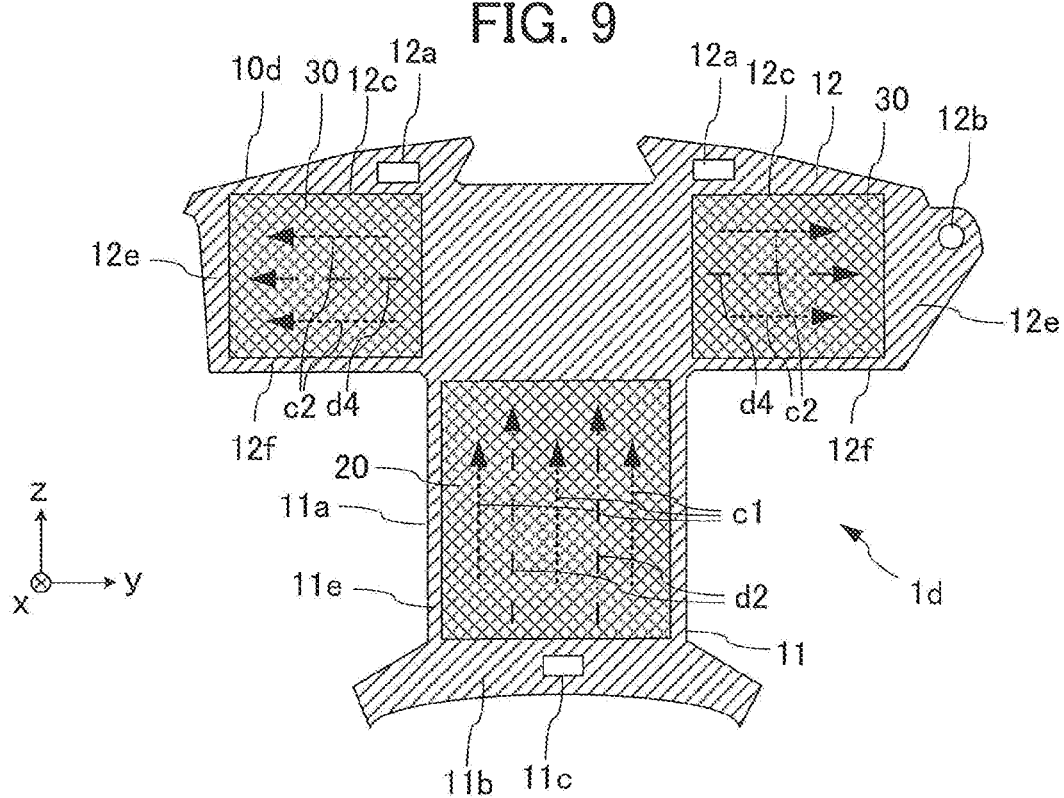
FIG. 9 is a cross-sectional view showing a schematic configuration of a stator core (in a state in which the first oriented core and the second oriented cores as the second cores are embedded in a first core) in a fifth embodiment of the present invention.

FIG. 9 is a cross-sectional view showing a schematic configuration of a stator core 1d (in a state in which the first oriented core 20 and the second oriented cores 30 are embedded in a first core 10d) in a fifth embodiment of the present invention. In FIG. 9, each component identical or corresponding to a component shown in FIG. 5 or FIG. 7 is assigned the same reference character as a reference character shown in FIG. 5 or FIG. 7. The stator core 1d in the fifth embodiment differs from the stator core 1 in the first embodiment in further including the second oriented cores 30 in addition to the first core 10d and the first oriented core 20. In other words, the stator core 1d in the fifth embodiment has a configuration as a combination of the stator core 1 in the first embodiment and the stator core 1b in the third embodiment.

In the stator core 1d according to the fifth embodiment, the stator core 1d includes the first cores 10d, the first oriented cores 20 and the second oriented cores 30, and the directions of the magnetic fluxes d2 and d4 flowing in the tooth part 11 and the yoke end part 12e of the stator core 1d and the easy magnetization directions c1 and c2 of the first oriented core 20 and the second oriented core 30 approximately coincide with each other. Accordingly, the stator 100 of high efficiency further inhibiting the iron loss compared to the stator 100 employing the stator core 1 in the first embodiment and the stator 100 employing the stator core 1b in the third embodiment can be obtained.

(6) Sixth Embodiment

Figure 10:
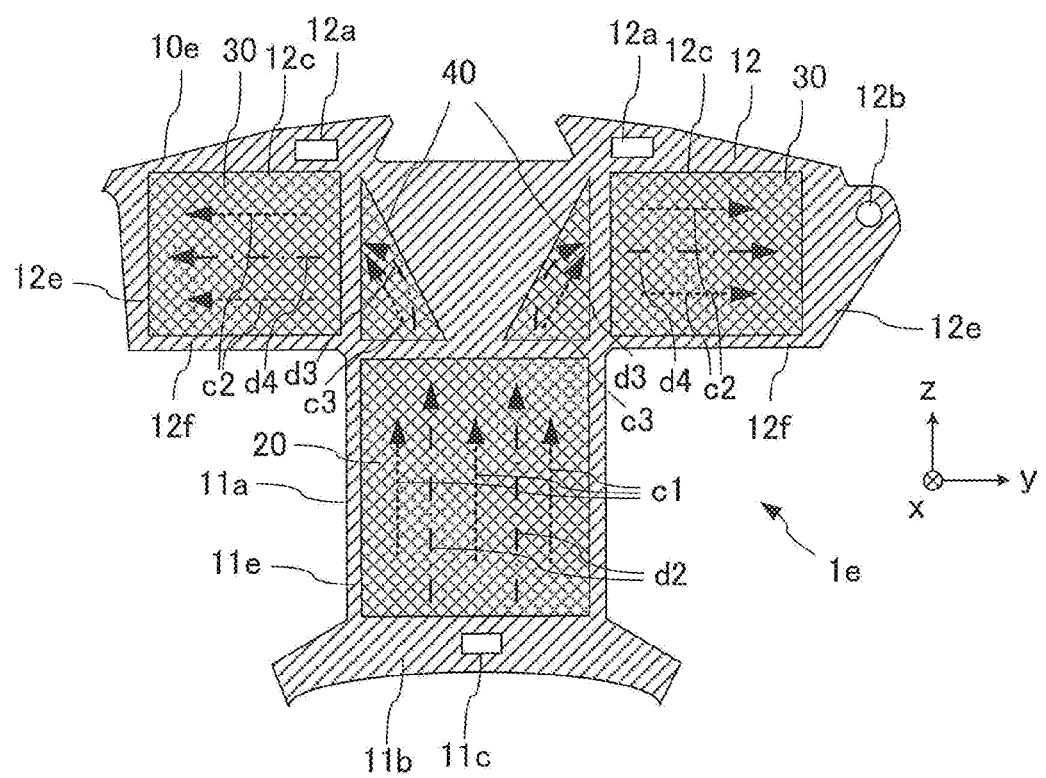
FIG. 10 is a cross-sectional view showing a schematic configuration of a stator core (in a state in which the first oriented core, the second oriented cores and the third oriented cores as the second cores are embedded in a first core) in a sixth embodiment of the present invention.

FIG. 10 is a cross-sectional view showing a schematic configuration of a stator core 1e (in a state in which the first oriented core 20, the second oriented cores 30 and the third oriented cores 40 are embedded in a first core 10e) in a sixth embodiment of the present invention. In FIG. 10, each component identical or corresponding to a component shown in FIG. 5 or FIG. 8 is assigned the same reference character as a reference character shown in FIG. 5 or FIG. 8. The stator core 1e in the sixth embodiment differs from the stator core 1 in the first embodiment in further including the second oriented cores 30 and the third oriented cores 40 in addition to the first cores 10e and the first oriented cores 20. In other words, the stator core 1e in the sixth embodiment has a configuration as a combination of the stator core 1 in the first embodiment and the stator core 1c in the fourth embodiment.

In the stator core 1e according to the sixth embodiment, the stator core 1e includes the first cores 10e, the first oriented cores 20, the second oriented cores 30 and the third oriented cores 40, and the directions of the magnetic fluxes d2, d3 and d4 flowing in the tooth part 11 and the yoke part 12 of the stator core 1e and the easy magnetization directions c1, c2 and c3 of the first oriented core 20, the second oriented core 30 and the third oriented core 40 approximately coincide with each other. Accordingly, the stator 100 of high efficiency further inhibiting the iron loss compared to the stator 100 employing the stator core 1 in the first embodiment, the stator 100 employing the stator core 1b in the third embodiment and the stator 100 employing the stator core 1c in the fourth embodiment can be obtained.

(7) Seventh Embodiment

Figure 11:
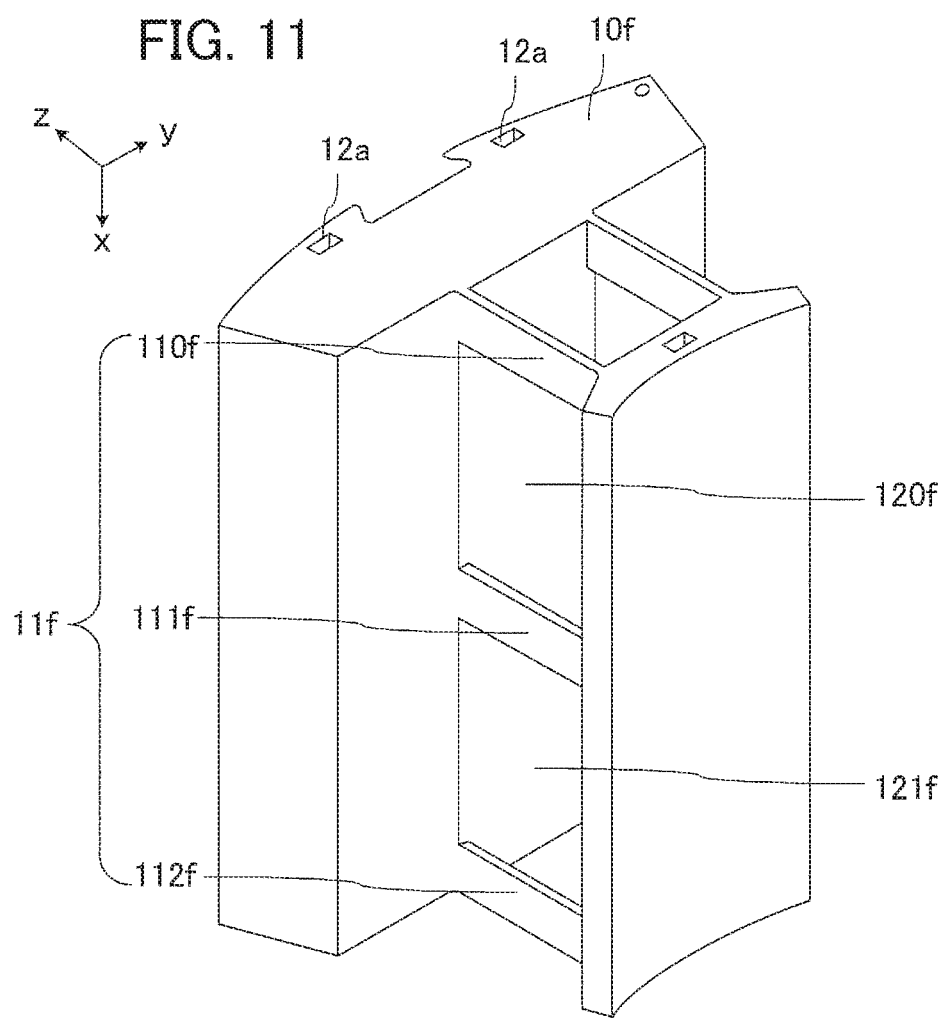
FIG. 11 is a perspective view showing a schematic configuration of a first core in a seventh embodiment of the present invention.
Figure 12:
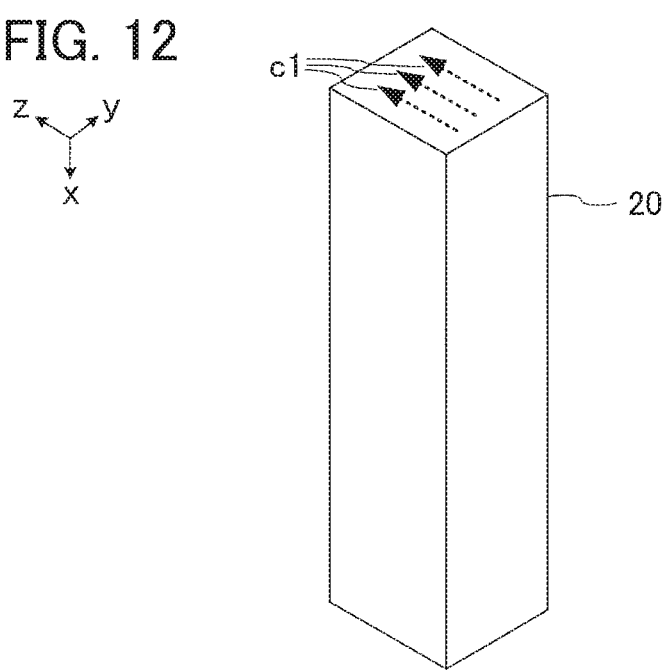
FIG. 12 is a perspective view showing a schematic configuration of the first oriented core as the second core in the seventh embodiment.
Figure 13:
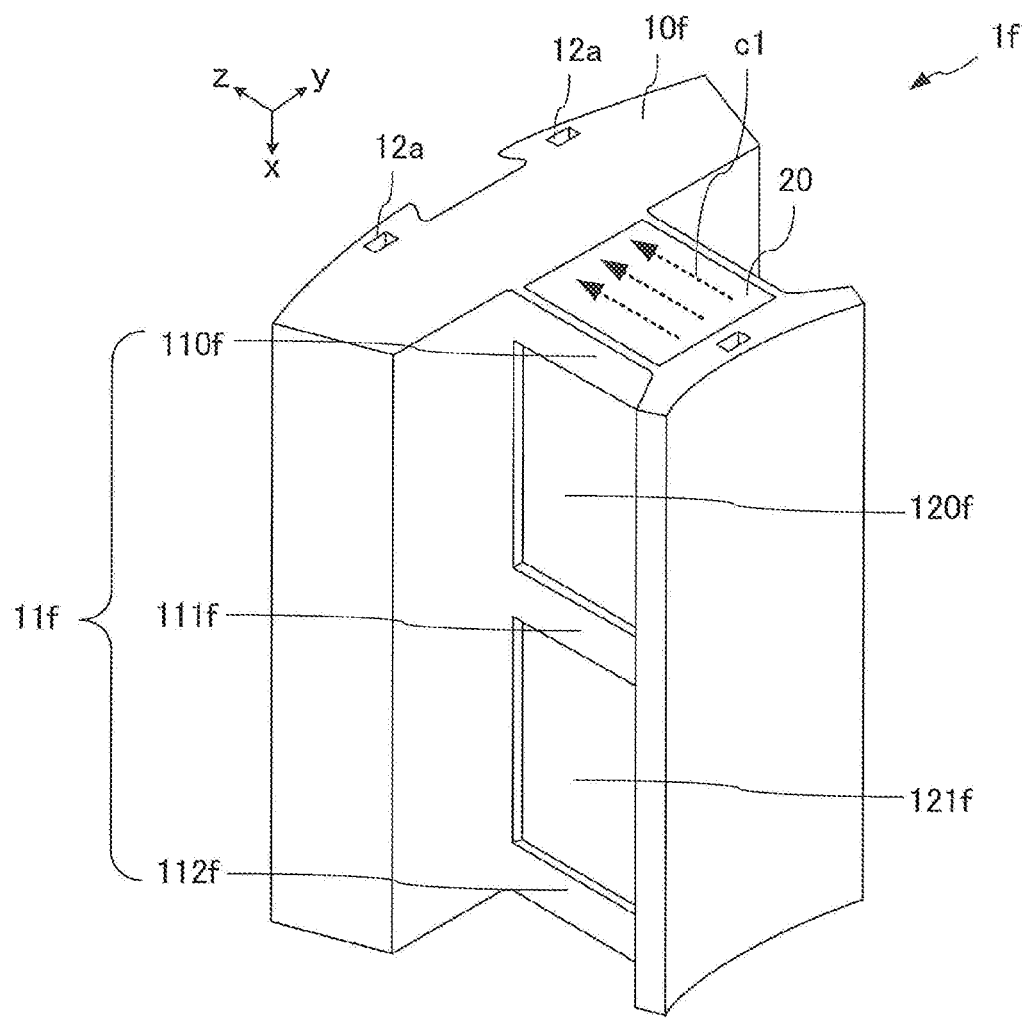
FIG. 13 is a perspective view showing a schematic configuration of the stator core (in a state in which the first oriented core as the second core is embedded in the first core) in the seventh embodiment.

FIG. 11 is a perspective view showing a schematic configuration of a first core 10f in a seventh embodiment of the present invention. FIG. 12 is a perspective view showing a schematic configuration of a first oriented core 20 in the seventh embodiment. FIG. 13 is a perspective view showing a schematic configuration of a stator core 1f (in a state in which the first oriented core 20 as the second core is embedded in the first core 10f) in the seventh embodiment. In FIG. 11, each component identical or corresponding to a component shown in FIG. 2 is assigned the same reference character as a reference character shown in FIG. 2. In FIG. 12, each component identical or corresponding to a component shown in FIG. 3 is assigned the same reference character as a reference character shown in FIG. 3. In FIG. 13, each component identical or corresponding to a component shown in FIG. 5 is assigned the same reference character as a reference character shown in FIG. 5. The stator core 1*f* of a stator according to the seventh embodiment differs from the stator core 1 in the first embodiment in that opening parts 120*f* and 121*f* are formed in each side surface extending in the axial direction and provided in each thin-wall part 11*f* of the first core 10*f*. In FIG. 13, the directions of the magnetic fluxes flowing in the stator core 1*f* are the same as the directions shown in FIG. 4, and thus their explanation is omitted.

As explained earlier, each thin-wall part 11*e* of the first core 10 in the first embodiment is formed continuously in the axial direction of the stator 100 (x direction). In contrast, each thin-wall part 11*f* of the first core 10*f* in the seventh embodiment includes the opening parts 120*f* and 121*f* formed in each side surface extending in the axial direction and provided in each thin-wall part 11*f*. As shown in FIG. 11, each thin-wall part 11*f* of the first core 10*f* in the seventh embodiment includes a thin-wall part 110*f* in an upper part, a thin-wall part 111*f* in a middle part and a thin-wall part 112*f* in a lower part formed separately in the upper part, the middle part and the lower part. In other words, each side surface of the tooth part 11 of the first core 10*f* in the seventh embodiment does not have a continuous shape.

In the stator core 1*f* according to the seventh embodiment, each thin-wall part 11*f* of the first core 10*f* has the opening parts 120*f* and 121*f* formed in each side surface extending in the axial direction and provided in each thin-wall part 11*f*, and has the thin-wall part 110*f* in the upper part, the thin-wall part 111*f* in the middle part and the thin-wall part 112*f* in the lower part formed separately in the upper part, the middle part and the lower part. According to this, the magnetic flux flowing into the thin-wall part 11*f* can be inhibited further compared to the stator 100 employing the stator core 1 according to the first embodiment and the magnetic flux can be proactively fed to the first oriented core 20. Accordingly, the stator 100 of high efficiency further inhibiting the iron loss can be obtained.

(8) Eighth Embodiment

Figure 14:
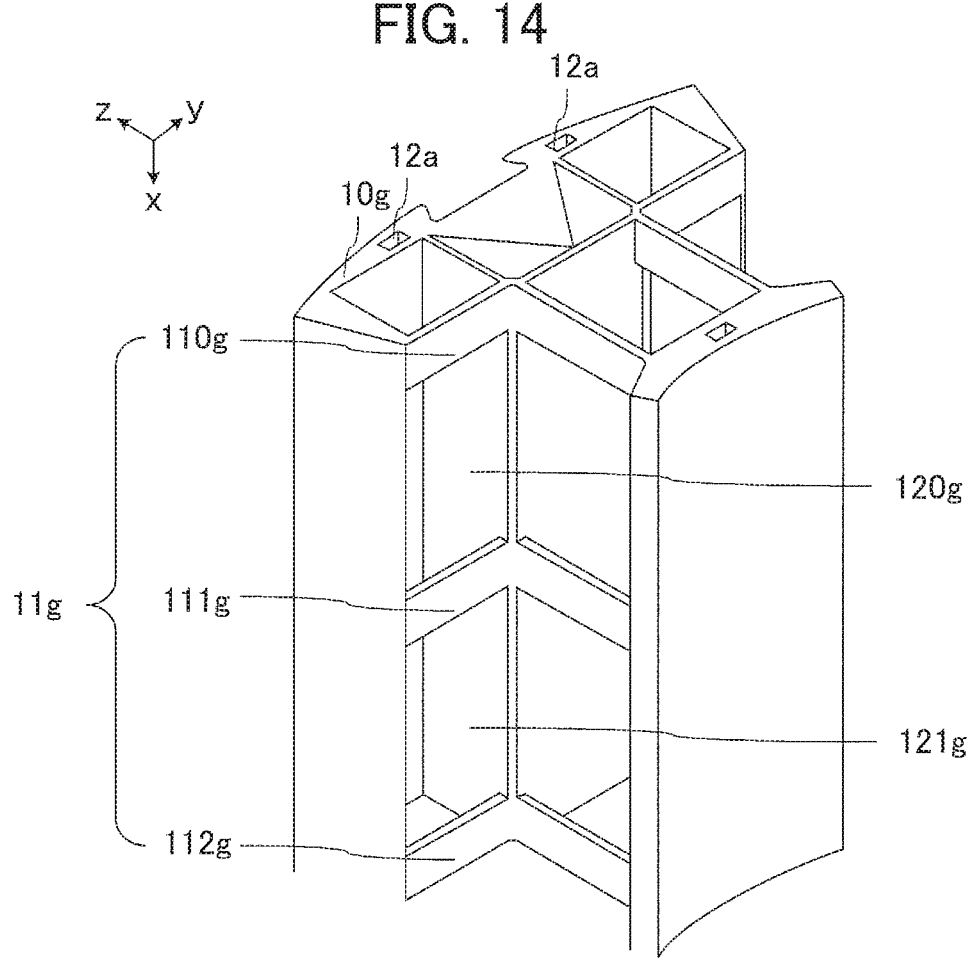
FIG. 14 is a perspective view showing a schematic configuration of a first core in an eighth embodiment of the present invention.
Figure 15:
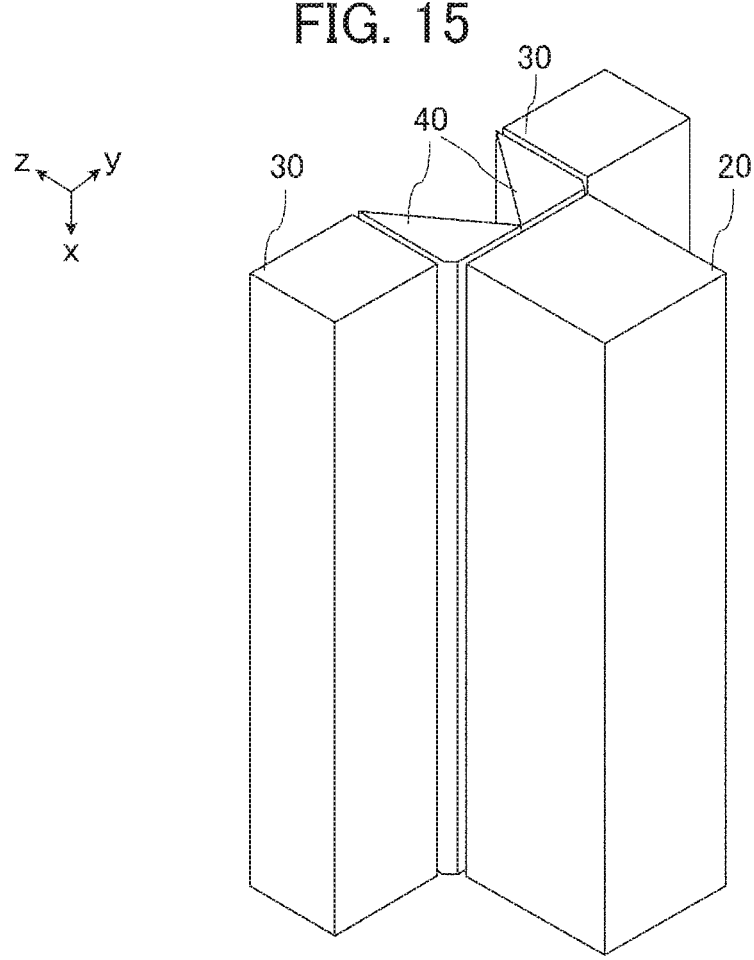
FIG. 15 is a perspective view showing a schematic configuration of the first oriented core, the second oriented cores and the third oriented cores as the second cores in the eighth embodiment.
Figure 16:
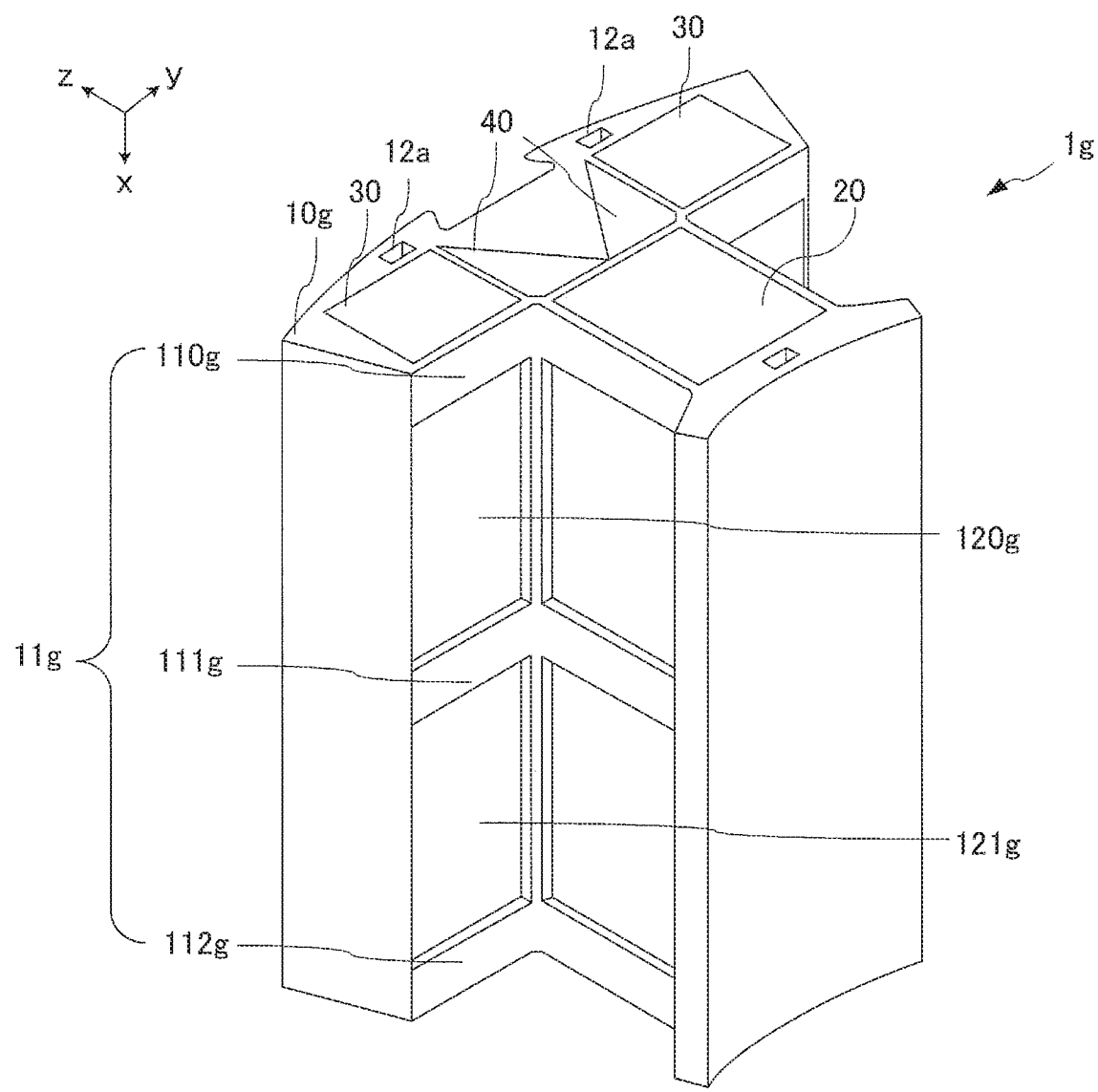
FIG. 16 is a perspective view showing a schematic configuration of the stator core (in a state in which the first oriented core, the second oriented cores and the third oriented cores as the second cores are embedded in the first core) in the eighth embodiment.

FIG. 14 is a perspective view showing a schematic configuration of a first core 10*g* in an eighth embodiment of the present invention. FIG. 15 is a perspective view showing a schematic configuration of a first oriented core 20, second oriented cores 30 and third oriented cores 40 as second cores in the eighth embodiment. FIG. 16 is a perspective view showing a schematic configuration of a stator core 1*g* (in a state in which the first oriented core 20, the second oriented cores 30 and the third oriented cores 40 are embedded in the first core 10*g*) in the eighth embodiment. In FIG. 14, each component identical or corresponding to a component shown in FIG. 11 is assigned the same reference character as a reference character shown in FIG. 11. In FIG. 15, each component identical or corresponding to a component shown in FIG. 12 is assigned the same reference character as a reference character shown in FIG. 12. In FIG. 16, each component identical or corresponding to a component shown in FIG. 13 is assigned the same reference character as a reference character shown in FIG. 13. The stator core 1*g* of the stator 100 according to the eighth embodiment differs from the stator core 1*f* in the seventh embodiment in further including the second oriented cores 30 and the third oriented cores 40 in addition to the first cores 10*g* and the first oriented cores 20. In other words, the stator core 1*g* in the eighth embodiment has a configuration as a combination of the stator core 1*e* in the sixth embodiment and the stator core 1*f* in the seventh embodiment.

As shown in FIG. 14 and FIG. 16, each thin-wall part 11*g* of the yoke part 12 of the first core 10*g* in the eighth embodiment has opening parts 120*g* and 121*g* formed in each side surface extending in the axial direction (x direction) and provided in each thin-wall part 11*g*. Further, the thin-wall part 11*g* of the yoke part 12 has a thin-wall part 110*g* in an upper part, a thin-wall part 111*g* in a middle part and a thin-wall part 112*g* in a lower part formed separately in the upper part, the middle part and the lower part. Further, as shown in FIG. 15 and FIG. 16, the stator core 1*g* in the eighth embodiment includes the second oriented cores 30 and the third oriented cores 40 in addition to the first cores 10*g* and the first oriented cores 20. In FIG. 15, the easy magnetization directions of the first oriented core 20, the second oriented core 30 and the third oriented core 40 are the same as the easy magnetization directions shown in FIG. 10, and thus their explanation is omitted. Further, the directions of the magnetic fluxes flowing in the stator core 1*g* are the same as the directions shown in FIG. 4, and thus their explanation is also omitted.

In the stator core 1*g* in the eighth embodiment, the stator core 1*g* includes the first cores 10*g*, the first oriented cores 20, the second oriented cores 30 and the third oriented cores 40, and the directions of the magnetic fluxes d2, d3 and d4 flowing in the tooth part 11 and the yoke part 12 of the stator core 1*g* and the easy magnetization directions c1, c2 and c3 of the first oriented core 20, the second oriented core 30 and the third oriented core 40 approximately coincide with each other. Accordingly, the stator 100 of high efficiency further inhibiting the iron loss compared to the stator 100 employing the stator core 1*f* in the seventh embodiment can be obtained.

In the stator core 1*g* according to the eighth embodiment, each thin-wall part 11*g* of the first core 10*g* has the opening parts 120*g* and 121*g* formed in each side surface extending in the axial direction and provided in each thin-wall part 11*g*, and has the thin-wall part 110*g* in the upper part, the thin-wall part 111*g* in the middle part and the thin-wall part 112*g* in the lower part formed separately in the upper part, the middle part and the lower part. According to this, the magnetic flux flowing into the thin-wall part 11*g* can be inhibited further compared to the stator 100 employing the stator core 1*f* according to the seventh embodiment and the magnetic flux can be proactively fed to the first oriented core 20. Accordingly, the stator 100 of high efficiency further inhibiting the iron loss can be obtained.

(9) Ninth Embodiment

Figure 17:
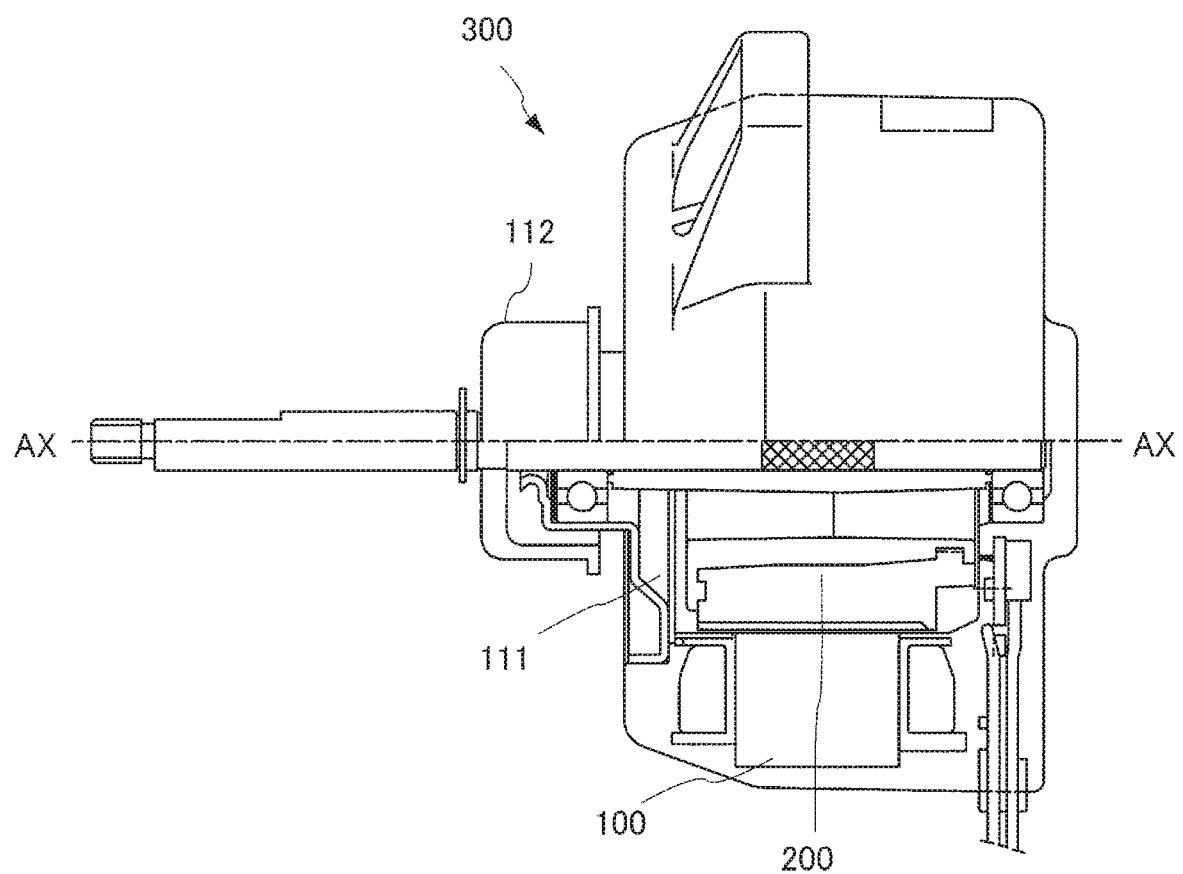
FIG. 17 is a side view showing a schematic configuration of a motor according to a ninth embodiment of the present invention.

FIG. 17 is a side view showing a schematic configuration of a motor 300 according to a ninth embodiment of the present invention. As shown in FIG. 17, the motor 300 according to the ninth embodiment includes the stator 100 according to any one of the first to eighth embodiments, the rotor 200, and a support part to which the stator 100 is fixed and which supports the rotor 200 to be rotatable (e.g., to be rotatable by using a bearing). The rotor 200 rotates around an axis line AX. The support part is formed of a bracket 111 rotatably supporting the rotor 200 and a frame (body frame), for example. The motor 300 has a waterproof cap 112 that inhibits penetration of water into the bearing and other parts of the motor 300.

According to the motor 300 according to the ninth embodiment, an effect of increasing the efficiency of the motor 300 can be obtained in addition to the effects obtained by the stator 100 described in any one of the first to eighth embodiments.

(10) Tenth Embodiment

Figure 18:
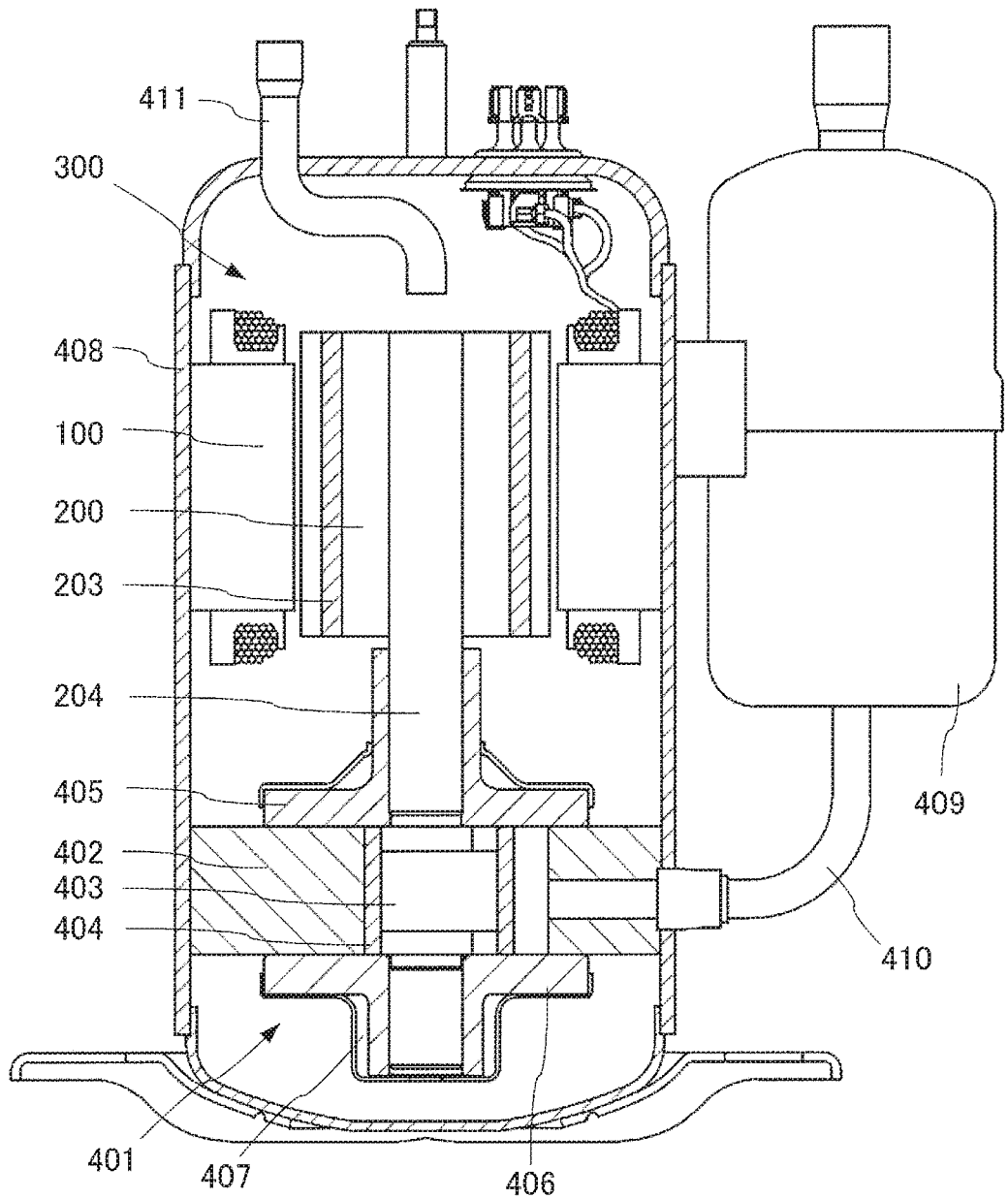
FIG. 18 is a cross-sectional view showing a schematic configuration of a compressor according to a tenth embodiment of the present invention.

FIG. 18 is a cross-sectional view showing a schematic configuration of a compressor 400 according to a tenth embodiment of the present invention. The compressor 400 according to the tenth embodiment is a rotary compressor equipped with the motor 300 according to the ninth embodiment described above. Incidentally, while the present invention covers compressors equipped with a permanent magnet embedded motor according to any one of the above-described embodiments, the type of the compressor is not limited to a rotary type. Further, the motor 300 is also not limited to a permanent magnet embedded motor. In FIG. 18, each component identical or corresponding to a component illustrated in FIGS. 1 to 17 is assigned the same reference character.

The compressor 400 includes the motor 300 (permanent magnet embedded motor) and a compression element 401 in a hermetic container 408. Although not illustrated in the drawing, refrigerator oil for lubricating sliding parts of the compression element is stored in a bottom part of the hermetic container. Principal components of the compression element 401 include a cylinder 402 arranged in a vertically stacked state, a rotary shaft 403 as a shaft rotated by the motor 300 (permanent magnet embedded motor), a piston 404 in which the rotary shaft 403 is inserted and fitted, a vane (not shown in the drawing) separating the inside of the cylinder into an intake side and a compression side, an upper frame 405 and a lower frame 406 as a pair of frames which close end faces of the cylinder 402 in regard to the axial direction and into which the rotary shaft 403 is rotatably inserted and fitted, and mufflers 407 attached to the upper frame 405 and the lower frame 406.

The stator 100 of the motor 300 is directly mounted in the hermetic container 408 by means of shrink fitting, welding or the like and held in the hermetic container 408. To the coils of the stator 100, electric power is supplied from a glass terminal fixed on the hermetic container 408. The rotor 200 is arranged on the inner-radius side of the stator 100 via the gap 3 and is rotatably held by a shaft bearing part (the upper frame 405 and the lower frame 406) of the compression element 401 via a rotary shaft 204 (shaft) at the center of the rotor 200.

Next, the operation of the compressor 400 will be described. Refrigerant gas supplied from an accumulator 409 is taken into the cylinder via an intake pipe 410 fixed to the hermetic container 408. By the motor 300 rotated by energizing an inverter, the piston 404 fitted on the rotary shaft 204 is rotated in the cylinder 402. Accordingly, the refrigerant is compressed in the cylinder 402. The refrigerant flows through the mufflers 407 and thereafter ascends in the hermetic container 408. At that time, the refrigerator oil has mixed into the compressed refrigerant. When the mixture of the refrigerant and the refrigerator oil passes through air holes formed through the rotor core, separation between the refrigerant and the refrigerator oil is promoted, by which the inflow of the refrigerator oil into a discharge pipe 411 can be prevented. The refrigerant compressed as above is supplied to a high-pressure side of a refrigeration cycle through the discharge pipe 411 provided on the hermetic container 408.

Incidentally, while known types of refrigerants such as R410A and R407C as HFC (hydrofluorocarbon) and R22 as HCFC (hydrochlorofluorocarbon) may be used as the refrigerant of the compressor 400, any type of refrigerant such as low GWP (Global Warming Potential) refrigerants can be employed. From the viewpoint of preventing global warming, low GWP refrigerants are desired. Typical examples of the low GWP refrigerants include the following refrigerants:

(1) Halogenated hydrocarbon containing a carbon double bond in the composition: e.g., HFO-1234yf ($CF_3CF=CH_2$). HFO is an abbreviation for hydro-fluoro-olefin, and olefin means an unsaturated hydrocarbon having one double bond. Incidentally, the GWP of HFO-1234yf is 4.

(2) Hydrocarbon containing a carbon double bond in the composition: e.g., R1270 (propylene). Incidentally, the GWP is 3, which is lower than that of HFO-1234yf, but its flammability is higher than that of HFO-1234yf.

(3) A mixture containing at least either a halogenated hydrocarbon containing a carbon double bond in the composition or a hydrocarbon containing a carbon double bond in the composition: e.g., a mixture of HFO-1234yf and R32. HFO-1234yf is a low-pressure refrigerant, and thus the pressure loss is great and the performance of the refrigeration cycle tends to deteriorate (especially in an evaporator). Thus, mixtures with R32, R41 or the like, as a high-pressure refrigerant relative to HFO-1234yf, are dominant from a practical viewpoint.

Such a configuration of the compressor 400 in which the motor 300 is installed makes it possible to provide the compressor 400 with excellent efficiency and reliability.

(11) Eleventh Embodiment

Figure 19:
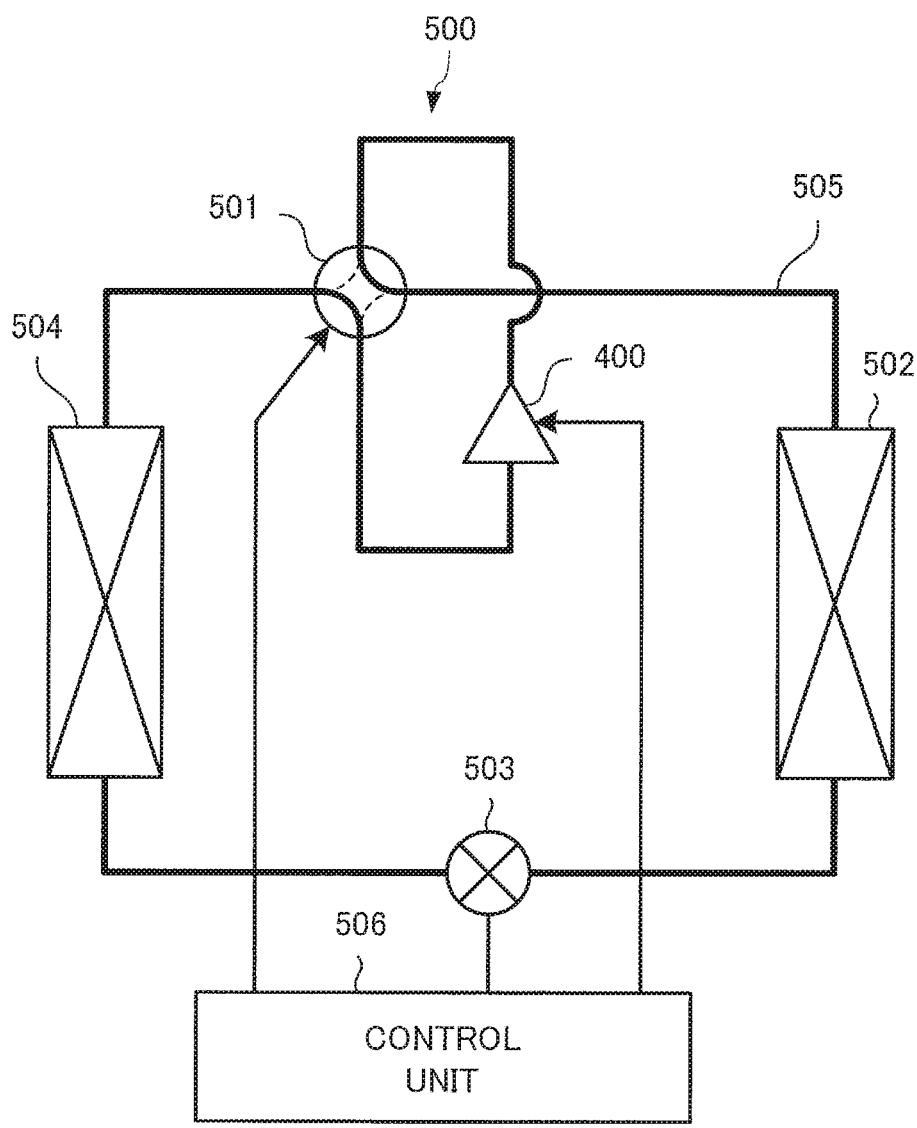
FIG. 19 is a diagram showing a schematic configuration of a refrigeration air conditioner according to an eleventh embodiment of the present invention.

FIG. 19 is a diagram showing a schematic configuration of a refrigeration air conditioner 500 according to an eleventh embodiment of the present invention. The present invention can be also carried out as a refrigeration air conditioner 500 including the above-described compressor 400 as a component of a refrigeration circuit. The refrigeration air conditioner 500 equipped with the compressor 400 will be described below.

Principal components of the refrigeration air conditioner 500 include the compressor 400, a four-way valve 501, a condenser 502 that performs heat exchange between the high-temperature and high-pressure refrigerant gas compressed by the compressor 400 and air, thereby condensing the refrigerant gas into a liquid refrigerant, an expander 503 that expands the liquid refrigerant into a low-temperature and low-pressure liquid refrigerant, an evaporator 504 that makes the low-temperature and low-pressure liquid refrigerant absorb heat, thereby evaporating the liquid refrigerant into a low-temperature and low-pressure gas refrigerant, and a control unit 506 that controls the compressor 400, the expander 503 and the four-way valve 501. The compressor 400, the four-way valve 501, the condenser 502, the expander 503 and the evaporator 504 are connected together by refrigerant piping 505 and constitute a refrigeration cycle.

Such a configuration of the refrigeration air conditioner 500 in which the compressor 400 is installed makes it possible to provide the refrigeration air conditioner 500 with excellent efficiency and reliability. Incidentally, the configuration of components in the refrigeration circuit of the refrigeration air conditioner 500 other than the compressor 400 is not particularly limited.

While the contents of the present invention have been specifically described above with reference to preferred embodiments, it is obvious that those skilled in the art can employ a variety of modified modes based on the fundamental technical ideas and teachings of the present invention. Further, the configurations shown in the above embodiments are those just illustrating an example of the contents of the present invention; it is also possible to combine some of the above embodiments, combine an embodiment with another publicly known technology, and omit or modify part of a configuration within a range not departing from the subject matter of the present invention.

What is claimed is:

1. A stator comprising:
   a first core
      including a plurality of non-oriented electromagnetic steel sheets that is stacked and
      having an insertion hole penetrating the plurality of non-oriented electromagnetic steel sheets in an axial direction of the stator; and
   a second core arranged in the insertion hole and including a plurality of oriented electromagnetic steel sheets that is stacked, wherein:
   the first core has a thin-wall part adjoining the second core,
   a conditional expression of $0.5tm \leq ta \leq 2tm$ is satisfied, where ta denotes a thickness of the thin-wall part when the first core is viewed in the axial direction and tm denotes a sheet thickness of one non-oriented electromagnetic steel sheet in the plurality of non-oriented electromagnetic steel sheets, and
   the thin-wall part has an opening part provided in a side surface extending in the axial direction of the stator and provided in the thin-wall part so that the opening part exposes a side surface of the second core.

2. The stator according to claim 1, wherein:
   the first core has a tooth part,
   the insertion hole has a first insertion hole formed in the tooth part, and
   the second core has a first oriented core provided in the first insertion hole of the tooth part, an easy magnetization direction of the oriented electromagnetic steel sheets of the first oriented core being parallel to a radial direction of the stator passing through the first insertion hole.

3. The stator according to claim 2, wherein
   a fitting part for fitting the first core and the second core together is provided in a boundary part between the first insertion hole and the second core in regard to the radial direction.

4. The stator according to claim 2, wherein:
   the first core has a tooth tip end part formed on an inner-radius side of the tooth part, and
   a thickness of the tooth tip end part in the radial direction when the first core is viewed in the axial direction is greater than the thickness to of the thin-wall part.

5. The stator according to claim 2, further comprising:
   an insulator covering the tooth part of the first core; and
   a winding wound around the tooth part via the insulator.

6. A motor comprising:
   the stator according to claim 1;
   a rotor; and
   a support part to which the stator is fixed and which supports the rotor to be rotatable.

7. A compressor comprising the motor according to claim 6.

8. A refrigeration air conditioner comprising the compressor according to claim 7.

9. A stator comprising:
   a first core
      including a plurality of non-oriented electromagnetic steel sheets that is stacked and
      having an insertion hole penetrating the plurality of non-oriented electromagnetic steel sheets in an axial direction of the stator; and
   a second core arranged in the insertion hole and including a plurality of oriented electromagnetic steel sheets that is stacked, wherein:
   the first core has a thin-wall part adjoining the second core,
   a conditional expression of $0.5tm \leq ta \leq 2tm$ is satisfied, where ta denotes a thickness of the thin-wall part when the first core is viewed in the axial direction and tm denotes a sheet thickness of one non-oriented electromagnetic steel sheet in the plurality of non-oriented electromagnetic steel sheets,
   the first core further has a yoke part having a yoke central part and a yoke end part,
   the insertion hole further has a second insertion hole formed in the yoke end part, and
   the second core further has a second oriented core provided in the second insertion hole, an easy magnetization direction of the oriented electromagnetic steel sheets of the second oriented core being parallel to a direction that is orthogonal to the radial direction of the stator passing through the first insertion hole.

10. The stator according to claim 9, wherein:
    the insertion hole further has a third insertion hole formed in the yoke central part, and
    the second core further has a third oriented core provided in the third insertion hole of the yoke central part, an easy magnetization direction of the oriented electromagnetic steel sheets of the third oriented core being a direction parallel to a direction of a straight line connecting a center of the first insertion hole and a center of the second insertion hole.

* * * * *